Nov. 13, 1934.   J. W. HALE   1,980,797
CHANGE SPEED SYSTEM
Filed June 6, 1933   3 Sheets-Sheet 3
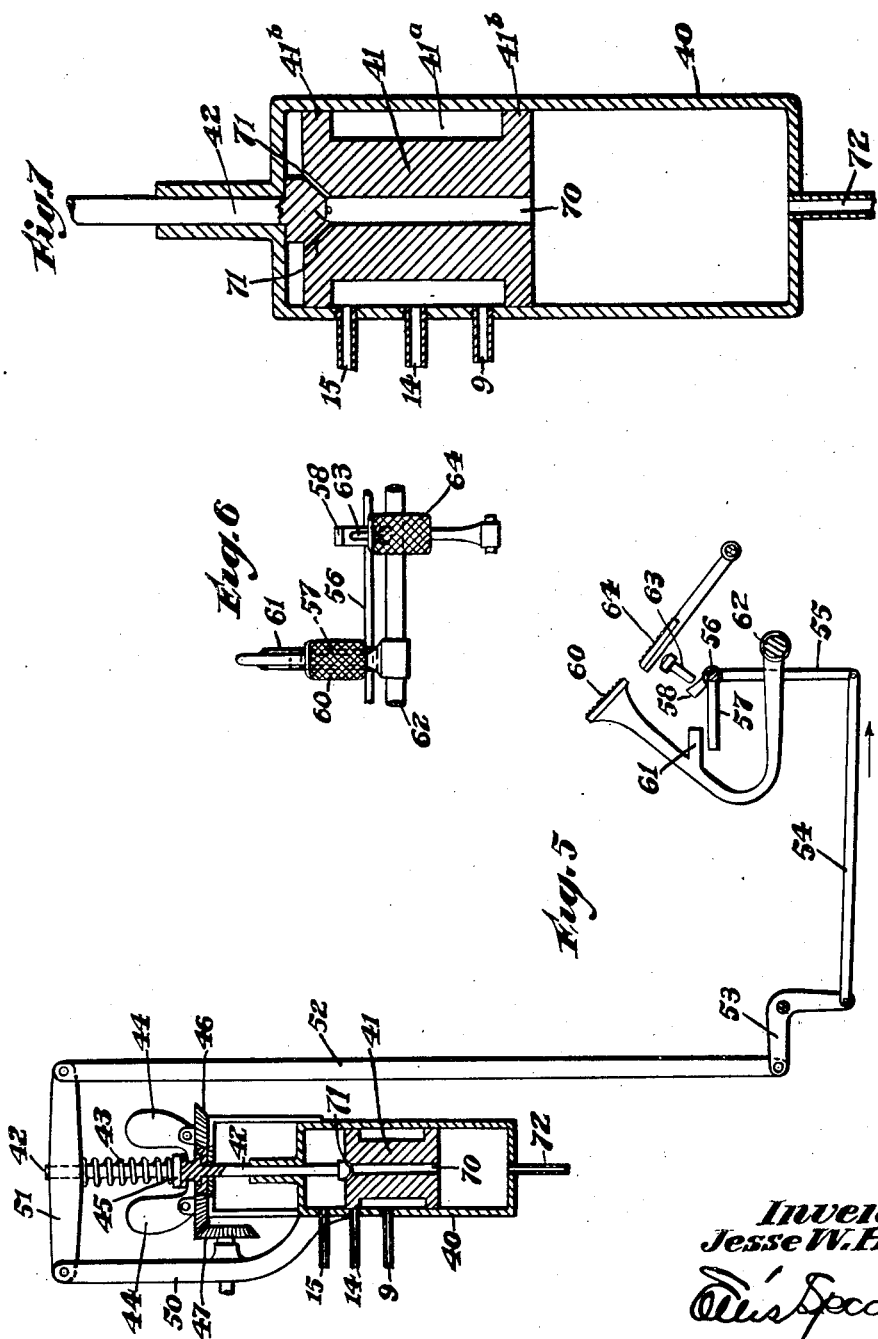
Inventor
Jesse W. Hale
By Attorney Patented Nov. 13, 1934

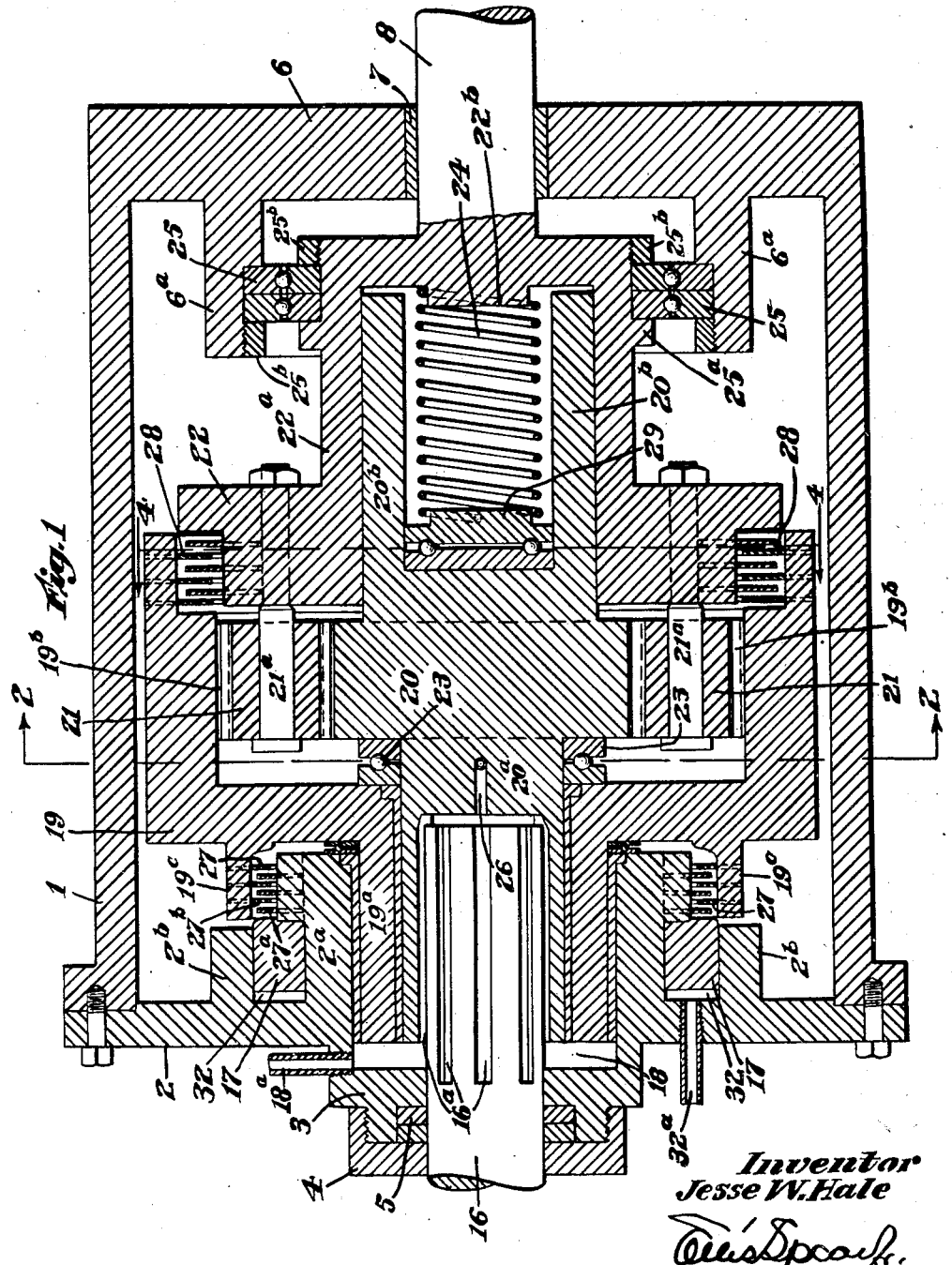

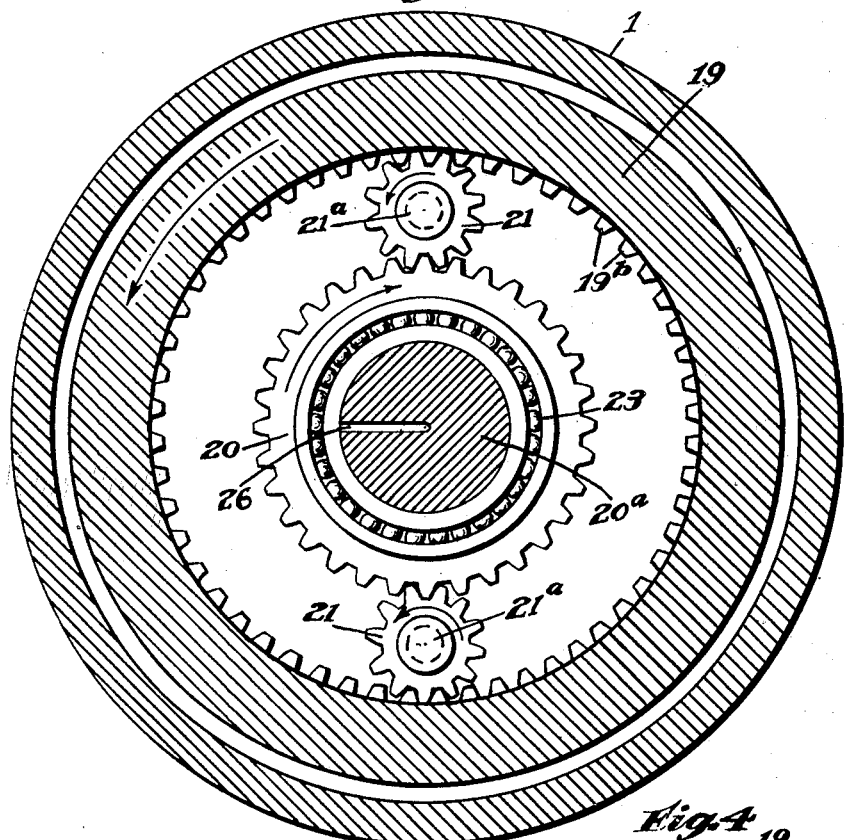
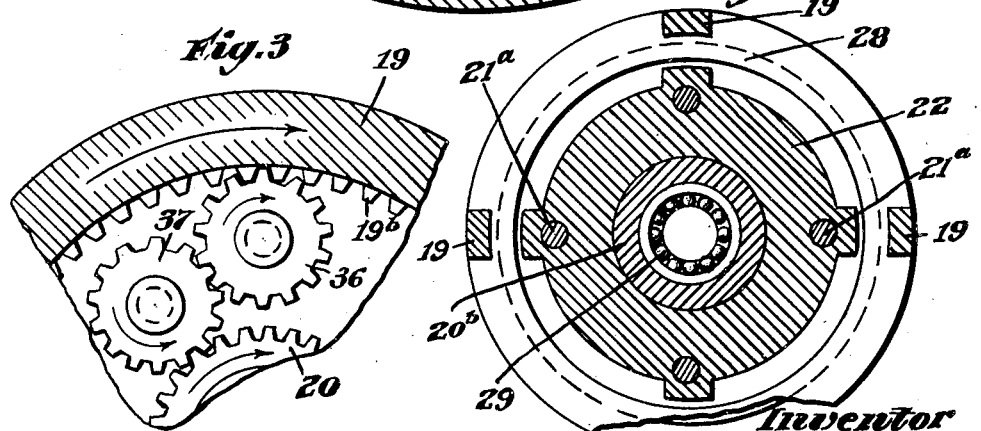

1,980,797

UNITED STATES PATENT OFFICE 1,980,797

CHANGE SPEED SYSTEM

Jesse W. Hale, Newton Center, Mass.

Application June 6, 1933, Serial No. 674,529

15 Claims. (Cl. 74—260)

This invention relates to an improvement in change speed systems and particularly to automatically controlled change speed mechanisms. The importance of such mechanisms has long been recognized and various devices have been proposed for effecting the desired progression in gear ratio between a driving shaft or like member and a driven shaft intended to derive power from the driving member. My invention contemplates change speed mechanism with governor control applicable to any type of power generator or transmission on which the load is to be absorbed gradually such as machinery of rolling mill type, printing presses, railways, automobiles or other apparatus normally starting under load. A characteristic use for which such devices are intended is with a motor as of the internal combustion type. Such a motor is started and acquires speed readily when not subjected to a sudden or heavy load. However, such sources of power are extremely susceptible to the retardation effects of a heavy load suddenly imposed. This is apt to cause a so-called stalling of the motor or otherwise a failure of power transmission and usually with unfavorable if not with serious effects upon the motor itself.

The requirements of most uses call for a reasonably flexible pickup of the load but particularly for practical purposes there is demanded a simplicity of structure with a range of control that can be adapted to requirements either predetermined or as they may occur.

The present invention contemplates a change speed system which is in itself simple and which is adapted to be operated as a single unit or in a group or battery of units by which ranges or degrees of progression may be attained according to the requirements of the use. In such a system it contemplates the combination with starting or accelerating control of hand or foot type with governors selectively operating at predetermined speeds to effect ratio changes in a gear system.

As illustrative of the present invention there is shown in the accompanying drawings characteristic embodiments involving principles well adapted to such uses and in themselves constituting a mechanism of simple character and capable of convenient and efficient construction and operation. Throughout the specification and drawings like reference characters are employed to indicate corresponding parts, and in the drawings:

Fig. 1 is a longitudinal sectional view through a characteristic motor unit in accordance with the invention.

Fig. 2 is a sectional view on the line 2—2, of Fig. 1, viewed in the direction of the arrows.

Fig. 3 is a fragmentary detail indicating a reverse gear modification in accordance with the invention.

Fig. 4 is a sectional view on the line 4—4, of Fig. 1, showing the clutch ring assembly.

Fig. 5 is a view of the governor unit of the system and connections.

Fig. 6 a fragmentary plan view of the control connections for such starting or accelerating or retarding or braking parts of the system, and Fig. 7 an enlarged sectional view of the governor cylinder.

In considering such a system in accordance with my invention, I will refer first to the change speed gearing unit by which the gear ratio is progressed and for which generally see Fig. 1.

In the illustrative embodiment shown in these drawings I have indicated at 1 a casing for the gears and operating parts. A main or power shaft 16 of an internal combustion motor or like source of power is axially alined with the cylindrical casing 1 and entered through its end plate 2 in an axial bearing boss 3 closed by the stuffing box 4 in which a packing 5 surrounds the shaft 16. The opposite end of the casing 1 is closed by a head 6 in which is a bearing 7 for the driven shaft 8 here shown as integral with the member 22 which will be later described.

Within the casing 1 and axially of the shaft 16 I provide a main gear 20 having a hollow hub 20ª in which the shaft 16 is entered and to which it is splined as at 16ª. The internal gear member 19 provided with a hub 19ª has internal gear teeth 19ᵇ. The hub 19ª surrounds the hub 20ª and is rotatable thereon and slidable therewith in an annular flange bearing 2ª of the plate 2. Between these two members is a thrust ball bearing 23.

Between the annular flange 2ª and a concentric flange 2ᵇ there is defined an annular cylinder 32. Within it is an annular piston 17 having a clutch contacting extension adapted to be moved inward by the fluid pressure admitted through an intake 32ª, but confined by the shoulder on the annular flange 2ª.

The piston 17 is disposed in operative relation to an annular clutch plate system 27. In this system 27 the plates 27ª and 27ᵇ are alternately mounted slidably, but non-rotatably on the bearing 2ᵃ and an annular flange 19ᶜ on the annular gear member 19.

On the main gear 20 I also provide a tubular hub 20ᵇ opposite to the axially alined hub 20ᵃ. The hub 20ᵇ is enclosed by an idler member 22 and its hub 22ᵃ. On the idler member 22 are mounted idler gears 21 freely rotatable on studs 21ᵃ carried by the idler gear member. These mesh with the main gear 20 and the internal gear teeth 19ᵇ on the member 19.

Between the annular overhang of the member 19 I provide an annular plate clutch 28, one set of plates being carried by the overhang of the internal gear member 19 beyond its annular gear teeth 19ᵇ and the other alternating plates by the spider member 28 so as to be engageable by movement of the internal gear member 19 axially of the casing. Such motion is opposed and the parts kept normally separated by a compression spring 24 disposed within the tubular hub 20ᵇ.

Within the external bearing hub 3 on the plate 2 I form a cylinder 18 through which the driving shaft 16 passes giving it substantially annular form. Fluid pressure is admitted to this through an intake 18ᵃ so as to admit operating pressure to the ends of the hubs 20ᵃ and 19ᵃ to move the main gear 20 and the internal gear member 19 spaced by the thrust bearing 23 axially of the casing against the action of the spring 24.

The hub 22ᵃ of the idler member 22 is itself held against longitudinal movement and in sustaining relation to the spring 24 by a combination annular and double thrust bearing 25. This is supported externally by the shoulder of an internal flange 6ᵃ on the head 6 and internally by a shouldered flange 25ᵃ on the hub 22ᵃ. The bearing 25ᵃ is held against said shoulder by rings 25ᵇ. I have indicated at 26 a leak off to relieve pressure from the power supply shaft. As indicated in Fig. 3, I may provide a reverse gear 36 meshing with idler gears 37 in substitution for the usual gearing, said reverse gears being mounted by any desired way to bring them in mesh and effect reverse rotation of the parts.

Such in general constitutes a change speed gear unit in accordance with my invention. As before stated, these may be arranged in multiple, as for example in tandem, in which the driven shaft of one unit may constitute the driving shaft of the next or they may be arranged in other order and suitably connected or geared together for progressive changes in the transmission.

In a system such as is herein involved the fluid pressure control is through a governor. While such governor may be of varied type, I have shown one particularly adapted for combination with the other parts of my system.

Referring to Fig. 5, I have indicated at 40 a casing of a governor in which is mounted a valve spool 41 carried by a stem 42. The stem 42 is held depressed by the spring 43 against the action of weighted arms 44 which tend to be thrown out by centrifugal action according to the speed of the gear 46. The weighted arms are pivoted to engage an annular collar 45 on the stem 42 and are rotated with the beveled gear 46 driven by a gear 47 suitably rotated from some driven part of the motor by which a direct response of speed is transmitted. The beveled gear is mounted in a bracket 50 to the upper end of which is pivoted a lever 51 which receives the end of the shaft 42 and bears on the spring 43. The lever 51 is connected by suitable linkage to the starting or accelerating control and braking or stopping control. The discussion herein being directed to automobile systems more particularly as illustrative of my invention, I have shown the lever 51 connected to a link 52. This is connected to one arm of a bell crank 53 the other arm of which is connected by a link 54 to a lever 55. This lever 55 rocks a shaft 56 on which are two arms 57 and 58. The arm 57 has its end disposed under a projection 61 of the foot brake 60 mounted on the usual cross shaft 62. The projection 58 is aligned with a push member 63 depressible by the accelerator or throttle pedal 64. The foot brake 60 and the toe throttle accelerator 64 are spaced apart as shown in Fig. 6 as illustrating usual construction, but it will be understood that they may be placed in any desired arrangement. It will be understood also that these members are simply used as illustrative in connection with my discussion of an automobile use. They might be hand levers or any other types of control in other uses or installations for starting or stopping a vehicle, railroad car or traction device or machine.

I have shown in Fig. 7 an enlarged view of the governor casing included in Fig. 5. Referring to both figures I have indicated pressure connections as at 14 for the end of the cylinder 32 and 15 for the end of the cylinder 18 and also a pressure supply 9 taking pressure from any desired source. The spool member 41 has an annular chamber 41ᵃ defined by the flanges of the spool ends 41ᵇ so as to span all three of the connections 9, 14 and 15 or on movement downward successively to cut off the pipe 15 and the pipe 14. The spool 41 is longitudinally bored as at 70 and vented by radial bores as at 71 to permit the distribution of fluid pressure and permit its escape through the relief 72 at the bottom of the casing 40.

In operation, as in the case of the motor vehicle selected for illustration, the operator depresses the toe throttle or accelerator 64 to cause the motor to speed up. If the depression is slight, the engine speed will cause the governor to raise the spool 41 until the chamber 41ᵃ unites the inlet 9 and the pipe 14 admitting pressure to the annular cylinder 32 producing low speed by causing the clutches 27 and 27ᵃ to hold the annular gear member 19 against rotation. As the motor picks up speed, the governor carries the spool 41 until the line 15 is also open to the chamber 41ᵃ permitting direct drive by admitting fluid to the cylinder 18 moving the members 19 and 20 forward against the action of the spring 24 so that the driving and driven members are interlocked. In case the operator desires more speed or power and depresses the throttle 64 before the governor has progressed the transmission, this further movement depresses the spring 43 through the connections 53 to 58, delaying the governor action and produces the shift in the gears as before described at a higher rate of speed.

When the brake 60 is operated to apply any braking system provided, my control system comes into effect in the following manner. As the brake 60 is depressed the projection 61 engages the arm 57 which through the linkage before described puts added pressure on the spring 43 thus tending to depress the stem 42 and the piston spool 41. This cuts off the connection 15 to the cylinder 18 causing the gears to assume their initial driving position which in the form shown would be first speed. The simple depression of the foot brake 60 at a proper limit throws the engine into first speed and makes it available as additional braking power.

In such a system, therefore, I provide for a basis of gear ratio progression, gear ratio diminution, automatic acceleration and progression and automatic engine braking in addition to the usual braking system provided. These features may be made to operate at various periods in various degrees by adjustment and proportioning of the parts and the relation of governor speed and fluid pressure. The mechanisms indicated are satisfactory for practical purposes but may be varied or other mechanisms substituted in the combinations indicated.

What I therefore claim and desire to secure by Letters Patent is:—

1. In a change speed device, a casing, a driving member axially entrant thereof, a main driving gear connected for axial movement relative to said driving member, an internally annular geared element, an annular cylinder on said casing externally of the main and internal gear elements, a fluid pressure port for said chamber, a second annular cylinder in said casing, an annular piston in said cylinder, an annular clutch between the main gear member and casing and operably associated with said piston, a fluid pressure port for said second annular cylinder, an inward hub on said main gear, a rotatable driven member thereon and rotatably and slidably bearing on said hub on the main gear, a compression spring between the main gear and casing end, idler gears on said driven member and meshing with said main gear and said internal gear, an annular clutch between the internal gear member and the driven member and engageable on the axial movement of the internal gear member relative to the driven member against the action of the said spring, whereby primary drive effected through the main gear and idler gears, the internal gear being held against rotation by pressure applied in the said named cylinder, is progressed by movement of said members by pressure in said first mentioned cylinder to free said internal gear for rotation relative to the casing and interlock it by engagement of the clutch between it and the driven member for a direct drive thereto.

2. In a change speed device, a casing, a driving member axially entrant thereof, a main driving gear connected for axial movement relative to said driving member, an internal annular geared element, an annular cylinder on said casing externally of the main and internal gear elements, a fluid pressure port for said chamber, a second annular cylinder in said casing, an annular piston in said cylinder, an annular clutch consisting of relatively engageable annular rings carried by the main gear member and casing and operably associated with said piston, a fluid pressure port for said second annular cylinder, an inward hub on said main gear, a rotatable driven member thereon and rotatably and slidably bearing on said hub on the main gear, a compression spring between the main gear and casing end, idler gears on said driven member and meshing with said main gear and said internal gear, an annular clutch consisting of relatively engageable annular rings carried by the internal gear member and the driven member and engageable on the axial movement of the internal gear member relative to the driven member against the action of the said spring, whereby primary drive effected through the main gear and idler gears, the internal gear being held against rotation by pressure applied in the said named cylinder, is progressed by movement of said members by pressure in said first mentioned cylinder to free said internal gear for rotation relative to the casing and interlock it by engagement of the clutch between it and the driven member for a direct drive thereto.

3. In a change speed device, a casing, a driving shaft axially entrant thereof, a main driving gear, a hollow hub thereon, an internally geared element, a hollow hub thereon having rotatable bearing on said gear hub, an annular cylinder on said casing externally of the two said hub ends, a fluid pressure port for said chamber, a second annular cylinder in said casing, an annular piston in said cylinder, an annular clutch between the main gear and casing and operably associated with said piston, a fluid pressure port for said second annular cylinder, a second hollow hub on said main gear, a rotatable driven member, a hollow hub thereon and rotatably and slidably bearing on said second named hub on the main gear, a compression spring therebetween, idler gears on said driven member and meshing with said main gear and said hollow gear, an annular clutch between the annular gear member and the driven member and engageable on the axial movement of the annular gear member relative to the driven member against the action of the said spring, whereby primary drive effected through the main gear and idler gears, the annular gear being held against rotation by pressure applied in the said named cylinder, is progressed by movement of said members by pressure in said first mentioned cylinder to free said hollow gear for rotation relative to the casing and interlock it by engagement of the clutch between it and the driven member for a direct drive thereto.

4. In a change speed device, a casing, a driving shaft axially entrant thereof, a main driving gear, a hollow hub thereon receiving said driving shaft and slidably engaged therewith and connected for axial movement relative thereto, an internally geared element, a hollow hub thereon having rotatable bearing on said gear hub, an annular cylinder on said casing externally of the two said hub ends, a fluid pressure port for said chamber, a second annular cylinder in said casing, an annular piston in said cylinder, an annular clutch between the main gear and casing and operably associated with said piston, a fluid pressure port for said second annular cylinder, a second hollow hub on said main gear, a rotatable driven member, a hollow hub thereon and rotatably and slidably bearing on said second named hub on the main gear, a compression spring therebetween, idler gears on said driven member and meshing with said main gear and said hollow gear, an annular clutch between the annular gear member and the driven member and engageable on the axial movement of the annular gear member relative to the driven member against the action of the said spring, whereby primary drive effected through the main gear and idler gears, the annular gear being held against rotation by pressure applied in the said named cylinder, is progressed by movement of said members by pressure in said first mentioned cylinder to free said hollow gear for rotation relative to the casing and interlock it by engagement of the clutch between it and the driven member for a direct drive thereto.

5. In a change speed device, a casing, a driving shaft axially entrant thereof, a main driving gear connected for axial movement relative thereto, an internally annular geared element, an annular cylinder on said casing externally of the two said gears, a fluid pressure inlet for said chamber, a second annular cylinder in said casing, an annular piston in said cylinder, means operably associated with said piston for engaging the gear member and casing, a fluid pressure inlet for said second annular cylinder, a rotatable driven idler member rotatable and slidable relative to the main gear, resilient means for holding said main gear and driven idler member apart, idler gears on said driven idler member and meshing with said main gear and said hollow gear, means for interlocking the annular gear member and the driven idler member and engageable on the axial movement of the annular gear member relative to the driven member against the action of the resilient means, whereby primary drive effected through the main gear and idler gears, the annular gear being held against rotation by pressure applied in the said named cylinder, is progressed by movement of said members by pressure in said first mentioned cylinder to free said hollow gear for rotation relative to the casing and interlock it by engagement of the clutch between it and the driven member for a direct drive thereto.

6. In a variable speed system, a change speed device including a casing, a driving shaft, a main driving gear connected for axial movement relative to said shaft, an internally geared annular element, an annular cylinder in said casing externally of the two said gears, a fluid pressure inlet for said chamber, a second annular cylinder in said casing, an annular piston in said cylinder, means operably associated with said piston for engaging the gear member and casing, a fluid pressure inlet for said second annular cylinder, a rotatable driven idler member rotatable and slidable relative to the main gear, resilient means for holding said main gear and driven idler member apart, idler gears on said driven idler member and meshing with said main gear and said hollow gear, means for interlocking the annular gear member and the driven idler member and engageable on the axial movement of the annular gear member relative to the driven member against the action of the resilient means, a speed governed fluid pressure control, a fluid pressure supply to said control, fluid pressure connections from said control to said change speed cylinders, a positive control dominant of said fluid pressure control, throttle and brake actuating devices, and connections for said positive control operably associated therewith whereby the positive control asserts domination over the speed governed control to effect a voluntary shift of gears in accelerating or retarding.

7. In a variable speed system, a change speed device including a casing, a driving shaft, a main driving gear connected for axial movement relative to said shaft, an internally geared annular element, an annular cylinder in said casing externally of the two said gears, a fluid pressure inlet for said chamber, a second annular cylinder in said casing, an annular piston in said cylinder, means operably associated with said piston for engaging the gear member and casing, a fluid pressure inlet for said second annular cylinder, a rotatable driven idler member rotatable and slidable relative to the main gear, resilient means for holding said main gear and driven idler member apart, idler gears on said driven idler member and meshing with said main gear and said hollow gear, means for interlocking the annular gear member and the driven idler member and engageable on the axial movement of the annular gear member relative to the driven member against the action of the resilient means, a speed governed fluid pressure control, a fluid pressure supply to said control, fluid pressure connections from said control to said change speed cylinders, a positive control resiliently dominant of said fluid pressure control, throttle and brake actuating devices, and connections for said positive control operably associated therewith whereby the positive control asserts resilient domination over the speed governed control to effect a voluntary shift of gears in accelerating or retarding.

8. In a variable speed system including a driving shaft and a driven shaft, a fixed casing, a differential gear connection within said casing between said shafts, a rotatable and slidable housing for said gears, clutches adapted to hold said housing to said casing and to said driven shaft successively, inlets through said casing for fluid under pressure, one of said clutches being mounted for limited horizontal movement, one of said fluid inlets being in contact with said clutch, the other of said inlets being disposed to divert fluid against said housing whereby said first named clutch is released and said second named clutch engaged, means urging the housing against said fluid pressures, and a governor responsive to engine speed in control of said fluid inlets.

9. In a variable speed system including a driving shaft and a driven shaft, a fixed casing, a differential gear connection within said casing between said shafts, a rotatable and slidable housing for said gears, clutches adapted to hold said housing to said casing and to said driven shaft successively, inlets through said casing for fluid under pressure, one of said clutches being mounted for limited horizontal movement, one of said fluid inlets being in contact with said clutch, the other of said inlets being disposed to divert fluid against said housing whereby said first named clutch is released and said second named clutch engaged, means urging the housing against said fluid pressures, a governor responsive to engine speed in control of said fluid inlets, and throttle and brake members connected to said governor whereby the gear ratio is adjusted to operating requirements.

10. In a variable speed system, a driving shaft and a driven shaft, a fixed casing, a differential gear connection between said shafts, a rotatable and slidable housing for said gears within said casing, clutches to hold said housing to said casing and to said shaft successively, inlets in said casing for fluid under pressure, one of said inlets being disposed to effect a clutch engagement holding said housing to said casing, the other of said inlets being disposed to effect a clutch engagement holding said housing to said shaft, and means directing the flow of fluid to the desired inlet whereby the gears are adjusted to operating conditions.

11. In a variable speed system, a driving shaft and a driven shaft, a fixed casing, a differential gear connection between said shafts, a rotatable and slidable housing for said gears within said casing, clutches to hold said housing to said casing and to said shaft successively, inlets in said casing for fluid under pressure, one of said inlets being disposed to effect a clutch engagement holding said housing to said casing, the other of said inlets being disposed to effect a clutch engagement holding said housing to said shaft, means urging said housing towards said inlets, and means directing the flow of fluid to the desired inlet whereby the gears are adjusted to operating conditions.

12. In a variable speed system, a driving shaft and a driven shaft, a fixed casing, a differential gear connection between said shafts, a rotatable and slidable housing for said gears within said casing, clutches to hold said housing to said casing and to said shaft successively, inlets in said casing for fluid under pressure, one of said inlets being disposed to effect a clutch engagement holding said housing to said casing, the other of said inlets being disposed to effect a clutch engagement holding said housing to said shaft, and governor controlled means directing the flow of fluid to the desired inlet whereby the gears are adjusted to operating conditions.

13. In a variable speed system, a driving shaft and a driven shaft, a fixed casing, a differential gear connection between said shafts, a rotatable and slidable housing for said gears within said casing, clutches to hold said housing to said casing and to said shaft successively, inlets in said casing for fluid under pressure, one of said inlets being disposed to effect a clutch engagement holding said housing to said casing, the other of said inlets being disposed to effect a clutch engagement holding said housing to said shaft, governor controlled means directing the flow of fluid to the desired inlet, and brake and throttle members connected to said governor whereby the gears are adjusted to operating conditions.

14. In a variable speed system including a driving shaft and a driven shaft, a fixed casing, a differential gear connection within said casing between said shafts, a rotatable and slidable housing for said gears, clutches adapted to hold said housing to said casing and to said driven shaft successively, inlets through said casing for fluid under pressure, one of said clutches being mounted for limited horizontal movement, one of said fluid inlets being in contact with said clutch, the other of said inlets being disposed to divert fluid against said housing whereby said first named clutch is released and said second named clutch engaged, means urging the housing against said fluid pressures, and a governor in control of said fluid inlets.

15. In a variable speed system including a driving shaft and a driven shaft, a fixed casing, a differential gear connection within said casing between said shafts, a rotatable and slidable housing for said gears, clutches adapted to hold said housing to said casing and to said driven shaft successively, pistons adapted to effect said engagements, fluid circuits to said pistons, means urging the housing out of said clutch engagement, and a governor in control of said fluid circuits.

JESSE W. HALE.